UNITED STATES PATENT OFFICE.

ELMER A. SPERRY, OF CLEVELAND, OHIO, ASSIGNOR TO NATIONAL BATTERY COMPANY, OF CLEVELAND, OHIO, AND JERSEY CITY, NEW JERSEY, A CORPORATION OF NEW JERSEY.

STORAGE BATTERY.

SPECIFICATION forming part of Letters Patent No. 723,327, dated March 24, 1903.

Application filed August 12, 1901. Serial No. 71,710. (No specimens.)

*To all whom it may concern:*

Be it known that I, ELMER A. SPERRY, a citizen of the United States, residing at Cleveland, in the county of Cuyahoga and State of Ohio, have invented certain new and useful Improvements in Storage Batteries, of which the following is a specification.

This invention relates to the manufacture of hard positive plates for storage batteries; and it has for its object to increase the hardness and density of such plates without interfering with the proper action of the electrolyte on the active material. In the manufacture of such plates or elements as usually carried on heretofore the active material or the composition of which the active material is the chief constituent is moistened with a liquid to form a plastic mass, which can be applied to the grid and pressed thereon under high pressure. In accordance with the present invention finely-divided metallic lead is employed as the active material and a particular menstruum is employed for the purpose of moistening the active material to form the plastic mass, the combination of such menstruum with the metallic lead having the effect of rendering the positive plates denser, and therefore better able to withstand the disintegrating influences to which they are subjected, than the plates or elements heretofore produced. The menstruum consists of a neutral liquid, preferably distilled water, to which is added ammonium hydroxid. The precise proportions of the mixture are not important; but it is found that one part of the hydroxid to two parts or three parts of water gives satisfactory results.

The dry powdered substance which forms the body of the element and which may by preference be a composition of metallic lead and ammonium sulfate is thoroughly mixed with the menstruum above described, as by violently agitating the dry powder and the liquid in a suitable vessel, and the plastic mass thus prepared is applied to the grid, which is then dried out under very high pressure. The element formed as above described is dense as compared with elements formed in the usual manner and resists much more successfully the disintegrating influences to which such elements are subjected.

I claim as my invention—

1. A composition for storage-battery elements consisting of finely-divided metallic lead moistened with a mixture of a neutral liquid and ammonium hydroxid.

2. A composition for storage-battery elements consisting of a mixture of finely-divided metallic lead and ammonium sulfate moistened with a mixture of a neutral liquid and ammonium hydroxid.

3. The process of preparing storage-battery elements which consists of moistening finely-divided metallic lead with a dilute solution of ammonium hydroxid and drying out the mass.

This specification signed and witnessed this 9th day of August, A. D. 1901.

ELMER A. SPERRY.

In presence of—
ROSWELL S. NICHOLS,
LUCIUS E. VARNEY.